United States Patent [19]
Stein et al.

[11] Patent Number: 5,968,217
[45] Date of Patent: Oct. 19, 1999

[54] EXPANDABLE FILTER CARTRIDGE

[76] Inventors: Myron Stein, 31412 Flying Cloud, Leguna Niguel, Calif. 29677; Ron Viskil, Houtmarkt 67, 2011, AL Haarlem, NL 2011, Netherlands

[21] Appl. No.: 08/887,991

[22] Filed: Jul. 3, 1997

[51] Int. Cl.⁶ .................................................. B01D 46/00
[52] U.S. Cl. ............................... 55/496; 55/497; 55/499; 55/501; 55/DIG. 31; 55/DIG. 35
[58] Field of Search ............................ 55/496, 497, 499, 55/501, DIG. 31, DIG. 35; 210/493.1, 493.3; 200/61.51, 61.52

[56] References Cited

U.S. PATENT DOCUMENTS

| | | |
|---|---|---|
| 1,122,437 | 1/1914 | Sweeney . |
| 1,491,868 | 4/1924 | Kunkel .............................. 55/DIG. 31 |
| 3,243,943 | 4/1966 | Getzin . |
| 3,761,653 | 9/1973 | Eranosian ............................. 200/61.51 |
| 3,841,555 | 10/1974 | Lilja . |
| 3,997,446 | 12/1976 | Nagakura . |
| 4,439,219 | 3/1984 | Lambrecht . |
| 4,512,891 | 4/1985 | Wright et al. . |
| 4,666,083 | 5/1987 | Yie . |
| 4,753,390 | 6/1988 | Henderson . |
| 4,932,561 | 6/1990 | Boxall . |
| 4,951,876 | 8/1990 | Mills . |
| 4,971,251 | 11/1990 | Dobrick et al. . |
| 5,252,111 | 10/1993 | Spencer et al. . |
| 5,281,401 | 1/1994 | Bryson, Sr. . |
| 5,364,458 | 11/1994 | Burnett et al. ............................ 55/496 |
| 5,368,622 | 11/1994 | McMillon ................................ 55/501 |
| 5,476,526 | 12/1995 | Attermeyer ....................... 55/DIG. 31 |
| 5,494,497 | 2/1996 | Lee . |
| 5,554,205 | 9/1996 | Ernst et al. . |
| 5,772,713 | 6/1998 | Salinas et al. ..................... 55/DIG. 31 |

*Primary Examiner*—Jay H. Woo
*Assistant Examiner*—Minh-Chau T. Pham
*Attorney, Agent, or Firm*—Womble Carlyle Sandridge & Rice

[57] ABSTRACT

An expandable filter cartridge for installation in the filter housing of a vehicle includes a rectangular frame having top and bottom legs and side legs. The side legs of the frame are extendible and retractable in length to configure the frame between a relatively compact size for insertion into the filter housing and a relatively expansive size for spanning the interior dimensions of the filter housing. The filter cartridge is installed by being inserted while in its compact configuration into a slot in the filter housing and, once inside, expanded to span the interior dimensions of the housing.

15 Claims, 1 Drawing Sheet

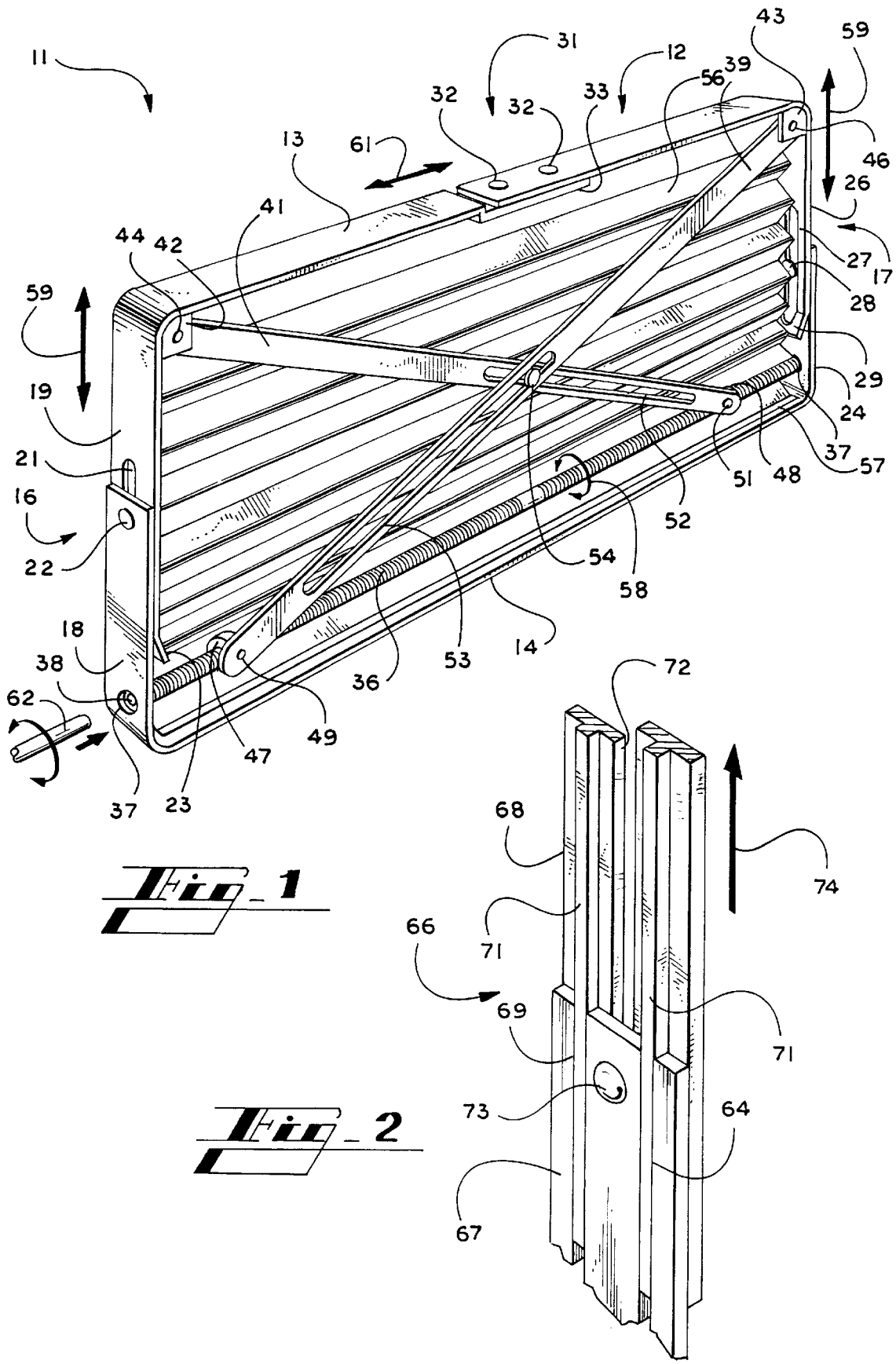
Fig_1
Fig_2

EXPANDABLE FILTER CARTRIDGE

TECHNICAL FIELD

This invention relates generally to filters and filter cartridges and more specifically to a filter cartridge that can be collapsed to a relatively small size for insertion into a cramped filter housing and expanded once inside the housing to span the inner dimensions of the housing.

BACKGROUND OF THE INVENTION

Filters are used in virtually all air conditioning and HVAC systems to filter out and remove a wide variety of airborne contaminates such as dust, dirt, pollen, bacteria, spores, and the like. Usually, one or more filter cartridges comprising a frame supporting a field of an appropriate filter medium is installed in a filter housing that positions the filter in the path of air flowing through the system. As air is circulated through the system, it passes through the filter medium, which collects the airborne contaminates while allowing the filtered air to pass. Periodically, such filters become so clogged with filtered matter that they begin to restrict the flow of air through the system and must be replaced. To this end, most filter cartridges are designed to be removed easily from their filter housings and replaced with a fresh cartridge.

Automobile heating and air conditioning systems are also usually provided with a replaceable filter or filters to remove airborne particles. This is particularly true of newer cars and trucks, which are often subject to regulations requiring that air be filtered as it is circulated into the cabin of the vehicle. Providing a car or truck with a filter element that is easily replaceable has proven to be a challenge, especially for passenger cars. The reason is that the filter element must be relatively expansive in surface area to accommodate the air flow of the vehicle's HVAC system. However, there usually is insufficient space under the dash of the vehicle or under the hood in some cases to provide a slot or opening in the filter housing long enough to accommodate a filter of such size.

As a solution to this space problem, auto makers have developed matable filter segments, each of which is narrow enough to be inserted into a short slot in the filter housing. These segmented filters are installed by being inserted one by one into the short slot. As each filter segment is inserted, it is pushed up manually above the position of the slot so that the next successive filter segment can be inserted into the slot. In some cases, the filter segments have edges configured to couple together as each filter segment is slid in under the previous segment. In this way, a unitary filter cartridge spanning the interior dimensions of the filter housing is progressively built up as each successive filter segment is inserted. The filter slot can then be closed for operation of the HVAC system. When it is desired to remove the filter for replacement, the slot is opened and the filter segments are progressively pulled out of the filter housing through the narrow slot, whereupon a new filter can be installed in successive segments as discussed above.

While segmented filters have proven functional in automotive HVAC systems, they have nevertheless been plagued with a variety of problems inherent in their design. First, the filters are relatively expensive to manufacture since each individual filter segment must be manufactured separately and three or more segments are required for each installation. Perhaps more problematic, however, is the inherent cumbersome and difficult procedure required to remove and replace the filter segments. In many instances, the filter housing and the filter slot therein is hidden beneath a cramped dash or under a cramped hood. As a result, a mechanic often must remove and install filter elements while lying prone on a floorboard or in some other relatively contorted position. To make matters worse, the installation of new filter elements sometimes must be done by feel in vehicles where the filter slot is not readily visible. As a result of such difficulties, it is not uncommon for less dedicated mechanics simply to remove an old clogged filter and close up the filter housing slot without installing a new filter. This leads ultimately to contamination and deterioration of the HVAC system because airborne bacteria and particles that are not filtered tend to collect on evaporators and working components of the HVAC system over time requiring a complete disassembly and cleaning.

Accordingly, there exists a need for an improved filter cartridge for installation in filter boxes located in cramped locations of vehicles. The cartridge should be inexpensive to manufacture, efficient in operation, and should be simple and easy to install, even when such installation must be accomplished by feel. It is to the provision of such a filter cartridge that the present invention is primarily directed.

SUMMARY OF THE INVENTION

Briefly described, the present invention, in one preferred embodiment thereof, comprises an expandable filter cartridge primarily intended for installation in the filter compartments of automotive HVAC systems. The filter cartridge includes a generally open frame formed of substantially rigid material such as metal or plastic. The frame has spaced top and bottom legs joined by opposed side legs to form a generally rectangular shape of the frame. Each of the side legs of the frame is formed by a pair of leg segments that are mutually slidably coupled together by means of a pin and slot arrangement. Thus, each of the side legs can be retracted in length to collapse the frame to a relatively small size or extended in length to expand the frame to a relatively large size.

A threaded rod extends along and just inside the bottom leg of the frame and is rotatably journaled at its ends within holes in the opposed side legs. One end of the threaded rod is provided with a wrench receiving head so that the rod can be rotated from the end of the frame by an allen or other appropriate wrench. A pair of crossed scissor jack arms extend between the top leg of the frame and the bottom leg thereof. One end of each arm is pivotably coupled to the top leg adjacent a respective end thereof and the other leg is threadedly coupled through a screw boss to the threaded rod. The threaded rod can thus be rotated in one direction to cause the scissor jack arms to extend and expand the frame and in the other direction to cause the scissor jack arms to retract to contract the frame.

A sheet of accordion folded filter media extends between and is secured to the top leg and the bottom leg of the frame and the folds of the sheet extend parallel to the top and bottom legs. The side edges of the sheet extend to the side legs of the frame so that the sheet forms a field of filter media that spans the entire area defined by the frame. When the frame is in its contracted configuration, the sheet is folded up and as the frame is expanded, the folds of the sheet expand with the frame so that the filter media fills the area defined by the frame at all times.

In use, the filter cartridge of this invention is contracted to its most compact configuration and inserted through the short slot in the filter housing of a vehicle. Once in place, an appropriate wrench is inserted into the wrench receiving head and rotated to expand the filter cartridge within the filter housing until the cartridge spans the width and breadth of the housing. The slot cover can then be replaced for operation of the HVAC system. The filter cartridge can be removed for replacement by removing the slot cover, retracting the cartridge with an appropriate wrench, and pulling the cartridge out of the slot in the filter housing.

Thus, it is seen that an improved expandable filter cartridge is now provided that addresses and solves the problems of prior art filter systems. More specifically, the cartridge is a single unit that is simple and relatively inexpensive to manufacture. Further, the cartridge is much easier to install in its filter housing than prior art segmented filter units and can easily be installed by feel without the need to see the process. Accordingly, mechanics are less likely to avoid replacing the filter when servicing the HVAC system. These and other objects, features, and advantages of the invention will become more apparent upon review of the detailed description set forth below taken in conjunction with the accompanying drawings, which are briefly described as follows.

BRIEF DESCRIPTION OF THE DRAWINGS

FIG. 1 is a perspective view of an expandable filter cartridge that embodies principles of the present invention in a preferred form.

FIG. 2 is a perspective view showing an alternate embodiment of the slidably mated side leg segments of the filter cartridge frame.

DETAILED DESCRIPTION OF THE PREFERRED EMBODIMENTS

Referring now in more detail to the drawings, in which like numerals refer to like parts throughout the several views, FIG. 1 illustrates one preferred embodiment of the expandable filter cartridge of this invention. The cartridge 11 is seen to include a frame 12 that, in the illustrated embodiment, is generally rectangular in shape. The frame 12 has top and bottom legs 13 and 14 that are joined at one end by a left side leg 16 and at the other end by a right side leg 17.

The left side leg 16 comprises a lower leg segment 18 and an upper leg segment 19 that are longitudinally slidably coupled together so that the side leg 16 can be extended and retracted in length. More specifically, the top segment 19 is formed with a longitudinally extending slot 21 and a rivet or pin 22 extends through the lower leg segment 18 and through the slot so that the segments are held together and yet are free to slide longitudinally relative to each other to extend and retract the side leg 16. Similarly, the right side leg 17 comprises a lower leg segment 24 and an upper leg segment 26 and these segments are longitudinally slidably coupled together by a rivet and slot so that the right leg, like the left, can be extended and retracted in length.

The upper segment 19 of the left leg 16 terminates at its bottom end in a short tab 23 that is angled slightly inwardly from the side of the frame and the slot 21 terminates near the bottom of the tab. The upper segment 26 of the right leg 17 also terminates at its bottom end in a tab 29 that is angled slightly inwardly from the side of the frame and the slot 27 terminates near the bottom of the tab as illustrated. The top leg 13 of the frame 12 is formed in two sections that are slidably joined together by means of a slotted offset portion 33 formed with a longitudinal slot (hidden in FIG. 1) and a pair of pins or rivets 32. With this configuration, the top leg 13 is free to extend and retract slightly for purposes more fully set forth below.

An elongated threaded rod 36 extends along and just inside the lower leg 14 of the frame and is rotatably journaled at it ends in respective holes 37 formed in the bottom portions of the side legs 16 and 17. The threaded rod 36 is provided at its left end in FIG. 1 with a wrench receiving head 38 that preferably is slightly recessed into the hole 37 in the end of the frame. In the preferred embodiment, the wrench receiving head is configured to receive a hex or allen wrench 62 that can be inserted and rotated manually to rotate the threaded rod 36 about it longitudinal axis. The left end portion of the threaded rod 36 is provided with a thread having a pitch in one direction while the right end portion of the thread is provided with a thread having a pitch in the opposite direction. For example, the threads on the left end portion of the rod may be left handed threads while the threads on the right end portion of the rod may be right handed threads.

A first elongated scissor jack arm 39 is pivotally secured at its top end by means of a rivet 46 to a corner tab 43 that, in turn, is mounted at the top right corner of the frame. A threaded screw boss 47 is pivotally secured with a screw 49 to the bottom end of the first scissor jack arm 39. The threaded screw boss 47 is threaded onto the left end portion of the threaded rod 36. In this way, when the threaded rod 36 is rotated in one direction, the threaded boss moves to the right carrying the bottom end of the scissor arm 39 to the right with it. Conversely, when the threaded rod is rotated in the other direction, the screw boss moves to the left, again carrying the bottom end of the scissor jack arm 39 with it.

Similarly, a second scissor jack arm 41 is pivotally secured at its top end by means of a rivet 44 to a corner tab 42 that is securely mounted in the top left corner of the frame. A threaded screw boss 39 is pivotally secured to the bottom end of the scissor jack arm 41 and is threaded onto the right end portion of the threaded rod. Since the right and left end portions of the rod 36 have oppositely handed threads, it will be understood that rotation of the threaded rod 36 in one direction causes the threaded screw bosses and thus the bottom ends of the scissor jack arms 39 and 41 to move toward each other. When the threaded rod 36 is rotated in the other direction, the screw bosses and the bottom ends of the scissor jack arms 39 and 41 are caused to move away from each other along the rod.

An elongated slot 53 is formed in the first scissor jack arm 31 and extends along the bottom end portion thereof. Similarly, an elongated slot 52 is formed in the second scissor jack arm 41 and extends along its bottom end portion. A rivet 54 extends loosely through the slots 52 and 53 so that the rivet is free to slide within each of the slots as necessary.

The just described configuration forms a scissor jack assembly that functions to expand and contract the frame 12 in the direction indicated by arrows 59 upon selective rotation of the threaded rod 36. More specifically, when a wrench 62 is inserted into the wrench receiving head 38 of the threaded rod 36 and rotated in one direction, the bottom ends of the scissor jack arms are moved toward each other, which causes the top ends of the scissor jack arms 39 and 41 to move up and thus push the top leg of the frame up to expand the frame to its expanded configuration. When the rod is rotated in the other direction, the bottom ends of the scissor jack arms 39 and 41 are moved away from each other, lowering the top leg of the frame to contract the frame to it compact configuration. As the scissor jack is expanded, the rivet 54 maintains the scissor jack arms in proper alignment while sliding down the slots 52 and 53 to accommodate relative movement of the arms.

As the frame is expanded in this manner to its extreme expanded configuration, the inwardly angled tabs 23 and 29 move into alignment with the top ends of the lower leg segments 18 and 24 respectively. As this happens, the angled tabs ride on the inside edges of the top ends of the lower segments causing the upper portion of the frame to expand slightly outwardly, accommodated by the sliding section 31 of the top leg of the frame. In this way, the upper segments 19 and 26 of the side legs move slightly outwardly to engage the walls of a filter housing in which the filter cartridge is being expanded. When the frame is retracted, the angled tabs 23 again ride along the inside edges of the top ends of the lower segments to allow the top portion of the frame to slide inside the lower section for retraction of the frame to is compact configuration.

An accordion folded sheet 56 of filter media is arranged with its folds extending parallel to the top and bottom legs of the frame 12 and is secured along its top and bottom edges to the top and bottom legs of the frame respectively. With the frame in its compact configuration, the folds of the sheet 56 are folded upon themselves in a corresponding compact configuration of the sheet 56. As the frame is expanded, the folds of the sheet expand like an accordion so that the sheet 56 expands along with the frame. Although not visible in FIG. 1, means for sealing between the free edges of the sheet 56 of filter media and the side legs of the frame can be provided if desired. Such means might include a peripheral bezel on the frame, a foam seal, or other appropriate means to minimize the passage of air around the ends of the sheet 56 during operation of an automotive HVAC system.

FIG. 2 illustrates an alternate embodiment of the configuration of the respective top and bottom segments of the side legs of the frame that avoids the necessity of an outwardly expandable frame upper portion and avoids the necessity of providing the sliding section 31 on the top leg of the frame. In this embodiment, the lower segment 67 of the side leg is provided with a pair of longitudinally extending parallel slots 69 and the upper segment 68 is provided with a corresponding pair of spaced parallel ribs 71 that are positioned to extend through the slots 69 in the lower segment 67. The ribs 71 extend outwardly from the upper segment 68 a distance substantially equal to the thickness of the lower segment 67 so that the ends of the ribs are coextensive with the outer surface of the lower segment. A central slot 72 is formed in the upper segment 68 and a rivet 73 extends through the upper end of the lower segment and loosely through the central slot 72 in the upper segment. With this configuration, the upper and lower segments are maintained in their aligned orientations by the slots and ribs. Further, as the frame is expanded in the direction of arrow 74, the ribs 71 ride against the interior wall of a filter housing in which the cartridge is being expanded to form a draft preventing seal between the wall of the filter housing and the sides of the frame.

The filter cartridge of this invention is simple and easy to install in the filter housing of a vehicle, even if the mechanic must install the cartridge by feel alone. First, the slot cover on the filter housing is removed to reveal the short slot for inserting the filter cartridge. The used filter cartridge, which may be configured in stacked sections as described above, can then be removed. The filter cartridge of the present invention is then inserted while in its compact configuration through the slot and into the filter housing. Once in place, an allen wrench is inserted into the wrench receiving head 38 of the threaded rod 36 and rotated in the appropriate direction to cause the frame of the cartridge to expand. The filter cartridge then begins to expand in the filter housing until the top leg of the frame engages the top wall of the filter housing so that the sheet of filter media forms a fieled that spans the interior dimension of the housing. The housing preferably is provided with an internal race within which the cartridge expands and the frame becomes nestled when fully expanded.

Once the filter cartridge is installed, the slot cover is replaced the cartridge functions to filter air circulated through the filter housing and into the vehicle. When it becomes necessary to remove the filter for replacement, the installation process is simply reversed. A mechanic need only insert a wrench, contract the filter cartridge by rotating the wrench, and pull it out of the filter housing slot. Again, removal can be accomplished by feel and the mechanic need not get in an awkward position or provide light in order to observe the procedure.

The invention has been described herein in terms of preferred embodiments. It will be obvious to those of skill in the art, however, that various modifications might well be made to the illustrated embodiments and that such modifications would fall within the scope of the invention. The frame, for example, could be formed from a variety of materials such as aluminum or molded plastic, which is preferred. Also, means other than a scissor jack assembly might be provided for expanding the filter cartridge once in the filter housing. Such means might include springs, pneumatic expansion cartridges, or other similar devices, it being the expandability of the cartridge to span the filter housing and not the particular means of expanding it that is encompassed by the invention. These and other additions, deletions, and modifications might well be made to the illustrated embodiments without departing from the spirit and scope of the invention as set forth in the claims.

We claim:

1. An expandable filter cartridge comprising a frame having top and bottom legs, each said top leg and said bottom leg having a first and second end, and each of said ends being joined by respective side legs, each of said side legs being formed of a lower leg segment and an upper leg segment that are slidably secured together so that said side legs are extended and retracted in length to expand said frame to a relatively expansive configuration and to contract said frame to a relatively compact configuration, means connected to said frame for selectively extending and retracting said side legs, and a sheet of expandable filter media attached to said top and bottom legs of and spanning said frame, whereby said frame, when in said compact configuration, is inserted into a filter housing and expanded to said expansive configuration to span the interior of the housing.

2. An expandable filter cartridge as claimed in claim 1 and wherein said means for selectively extending and retracting said side legs comprises a scissor jack assembly mounted to said frame.

3. An expandable filter cartridge as claimed in claim 2 and wherein said scissor jack assembly comprises a threaded rod extending along and inside said bottom leg of said frame and a pair of scissor jack arms having top and bottom ends, each said bottom end of said scissor jack arms being threadedly coupled to said threaded rod and pivotally coupled at each of said top ends of said scissor jack arms to said top leg of said frame, said bottom ends of said scissor jack arms being moved together to expand said frame upon rotation of said threaded rod in one direction and being moved apart to retract said frame upon rotation of said threaded rod in the other direction.

4. An expandable filter cartridge as claimed in claim 3 and wherein said frame is formed of plastic.

5. An expandable filter cartridge as claimed in claim 3 and wherein said frame is formed of metal.

6. An expandable filter cartridge as claimed in claim 1 and wherein said sheet of filter media is accordion folded with said folds of said sheet extending parallel to said top and bottom legs of said frame for expansion of said sheet of filter media as said frame is expanded.

7. An expandable filter cartridge for insertion through a relatively small opening in a filter housing and subsequent selective expansion within the filter housing to span the interior of the housing, said expandable filter cartridge comprising a frame, means connected to said frame for expanding and contracting said frame between a relatively compact configuration insertable through the opening in the filter housing and a relatively expansive configuration wherein said frame corresponds in size and shape to the interior profile of the filter housing, and filter means spanning said frame and being expandable with said frame as said frame moves between said compact configuration and said expansive configuration.

8. An expandable filter cartridge as claimed in claim 7 and wherein said frame is generally rectangular in shape having a top leg, a bottom leg and side legs, said side legs being extendable and retractable in length to expand and contract the size of said frame, said cartridge further comprising means for selectively extending and retracting said side legs for expanding and contracting said frame.

9. An expandable filter cartridge as claimed in claim 8 and wherein each of said side legs is formed from an upper segment and a lower segment longitudinally slidably coupled together for extension and retraction of said side leg.

10. An expandable filter cartridge as claimed in claim 9 and wherein said bottom segment of each leg is formed with at least one slot and wherein said top segment is formed with a corresponding projecting rib that extends through said slot, said rib extending to a position substantially coextensive with the outer surface of said bottom segment for engaging and sealing against an inner wall of a filter housing as said filter cartridge is expanded within said housing.

11. An expandable filter cartridge as claimed in claim 8 and wherein said means for selectively extending and retracting said side legs comprises a scissor jack assembly.

12. An expandable filter cartridge as claimed in claim 11 and wherein said scissor jack assembly comprises a threaded rod extending along and inside one leg of said frame and a pair of crossed scissor jack arms having opposed ends, one end of each arm being pivotally secured to the leg of said frame opposite said threaded rod with the other leg being threadedly secured to said threaded rod, said legs of said scissor jack arms being moved together by rotation of said rod in one direction and moved apart by rotation of said rod in the other direction to expand and contract said frame.

13. A method of installing a filter cartridge in the filter housing of a vehicle wherein the filter housing is provided with a relatively small opening for insertion of the filter cartridge, said method comprising the steps of:

(a) contracting the filter cartridge to a relatively compact configuration insertable through the opening in the filter housing;

(b) inserting the contracted filter cartridge through the opening and into the filter housing; and (c) expanding the filter cartridge within the housing until the cartridge substantially spans the interior of the housing.

14. The method of claim 13 and wherein the filter cartridge has a relatively rectangular frame with side legs and wherein step (a) comprises retracting the side legs of the frame in length.

15. The method of claim 14 and wherein step (c) comprises activating a scissor jack assembly arranged to extend the length of the side legs of the frame.

* * * * *